July 29, 1969  G. A. LESSELLS ET AL  3,458,144
ATTRITOR MILL

Filed April 17, 1967  2 Sheets-Sheet 1

INVENTORS
GERALD A. LESSELLS
NICHOLAS PANAGIOTAKIS.

3,458,144
ATTRITOR MILL
Gerald A. Lessells and Nicholas Panagiotakis, Middlesex County, N.J., assignors to Mobil Oil Corporation, a corporation of New York
Filed Apr. 17, 1967, Ser. No. 631,440
Int. Cl. B02c *13/18, 13/26*
U.S. Cl. 241—46.02                        10 Claims

ABSTRACT OF THE DISCLOSURE

Apparatus for dispersing and grinding pigment pastes in which an axial shaft disposed within a cylindrical chamber is rotated to move a plurality of rods or arms and thereby shear the paste and grinding media disposed within the chamber. The chamber is supplied with paste at one end with the paste moving through the mill to exit through a screen at the other end. Complete mixing is achieved using floating discs to space the rods into separated sections, the discs coming close to the walls of the chamber to insure that all of the paste is subjected to the shearing action of the rods.

---

The present invention relates to sand grinding apparatus for dispersing and grinding pigment pastes and more particularly to apparatus which might be termed an attritor mill or bar mill and which comprises a cylindrical chamber within which an axial shaft is rotated to carry radial bars or arms around the chamber with their outer ends extending toward the cylindrical wall of the chamber in order to shear a sand-containing pigment paste dispersed within the mill and thereby grind the pigment and disperse it within the paste.

While various types of sand grinding mills are known, the invention is concerned with the type of mill in which bars are moved through grinding media in order to provide vigorous agitation and thereby enable coarse pigments to be adequately disrupted and dispersed in the paint vehicle. Unfortunately, and when bars are used in the manner indicated, there is a tendency for portions of the paste which is fed to the mill to move more or less directly to the outlet and escape the full shearing action of the bars. As a result, portions of the pigment are inadequately dispersed and the product of the mill is inferior.

In an effort to repress this tendency of portions of the feed paste to escape the shearing action, we have attempted to fix discs on the axial agitating shaft, but this was not helpful. Small discs did not improve the grinding efficiency and when large discs closely approaching the cylindrical walls of the mill are fixed to the shaft, then the grinding media is caused to impact strongly on these walls causing rapid erosion. We have found that when discs which closely approach the cylindrical walls of the mill are rotatably mounted on the axial agitating shaft and spaced apart along the length thereof to divide the agitating bars into a plurality of sections, grinding efficiency is improved even though good flow rates are maintained and the discs do not cause serious erosion of the mill walls.

It is desired to point out that the invention is particularly directed to the practical dispersion of pigments including hard coarse pigments in a manner permitting the achievement of finished paints of satisfactory industrial quality utilizing a minimum number of passes through the mill. In preferred operation, single pass operation has been achieved. As will be appreciated, when a second pass or an additional pass is needed, considerable unnecessary energy is expended, the loss of grinding media per product produced is greatly increased, and the productivity of the equipment is greatly reduced. From this standpoint, a single disc positioned half-way up the shaft is helpful, but not fully adequate and two or more discs are needed to provide fully satisfactory operation.

The invention will be more fully understood from the description which follows taken in conjunction with the accompanying drawings in which.

Figure 1:
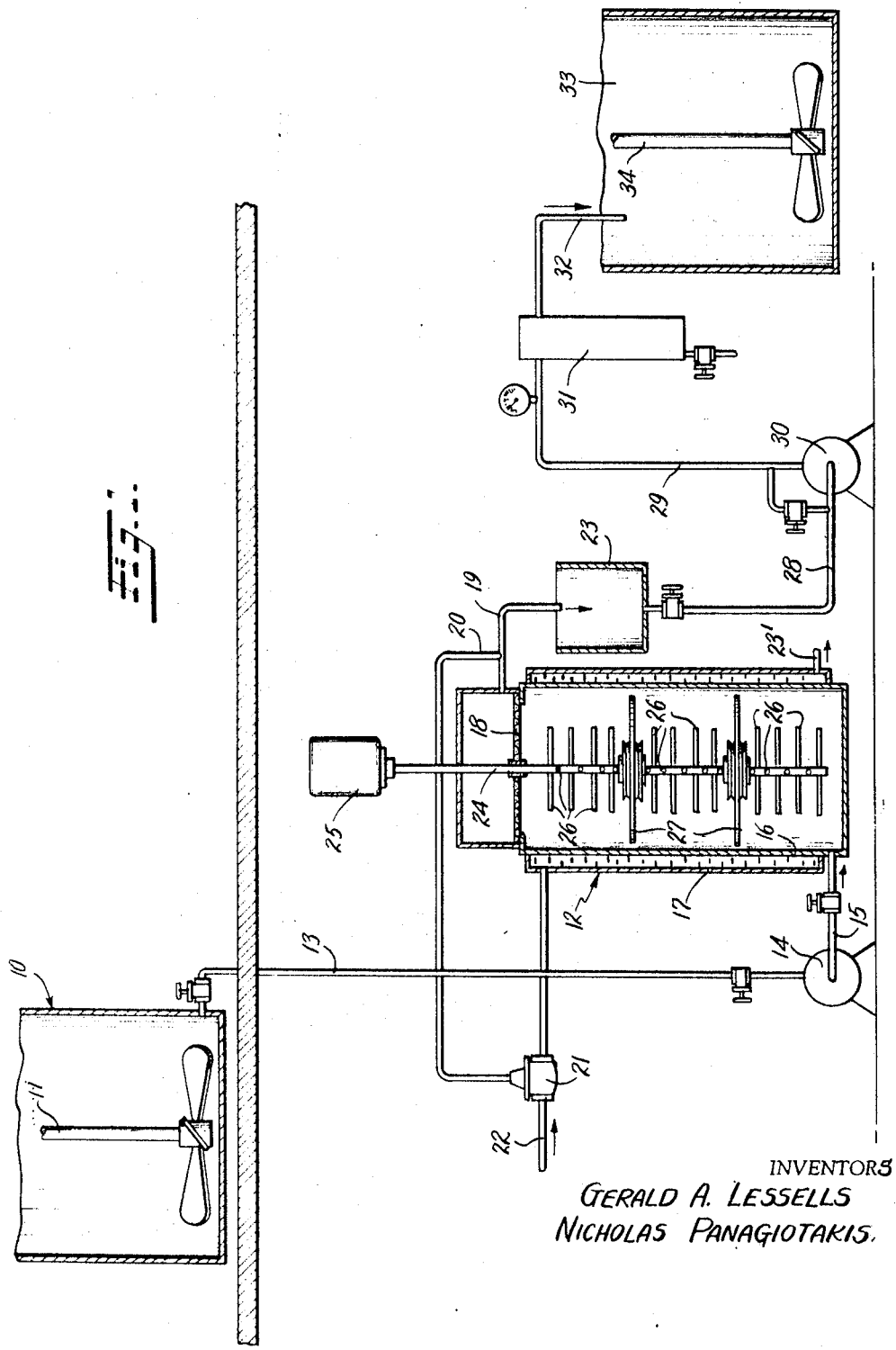
FIG. 1 is a process flow sheet which broadly indicates the manner in which the pre-mixed paste is handled in order that it be dispersed and filtered, and showing the overall structure of the attritor mill of the invention.

Referring more particularly to FIG. 1, the pigment and vehicle (including vehicle binder and solvent) are pre-mixed and stored in a feed tank 10 where it is maintained under agitation using an agitator generically identified by numeral 11. The agitator is simply to prevent pigment settling. It is convenient to thoroughly pre-mix the batch to be dispersed as by using a 50 H.P. Hockmeyer, but this merely mixes the batch and does not disperse the pigment. For example, simple mixing might provide a 6 Hegman grind rating when a typical micronized hard pigment is used as the pigment or a 4–4½ Hegman grind rating when a typical coarse hard pigment is used. In contrast, a Hegman grind rating of 6¾–7 is frequently needed for the ground paste in order to meet industrial standards. If desired, the pre-mixing operation can be done more thoroughly to ease the burdon on the attritor mill, but this is not essential.

The pre-mixed paste in feed tank 10 is fed to the bottom of the mill 12 via line 13, feed pump 14 and line 15. While the invention does not require the mill 12 to be of any particular size, a 40 gallon mill was used and powered by a 60 H.P. motor (though a 40 H.P motor was also used to good effect) For a mill of the type referred to, flow rates of from 30–130 gallons per hour were found useful, but 50–60 gallons of paste per hour was the best range since lower flow rates provide only small improvement in grind quality and higher flow rates cause the grind quality to fall off so that, where high industrial standards must be met, a second grind pass would be needed However, a feature of the invention is the fact that excellent grind standards can be satisified using flow rates which replace the capacity of the mill in less than one hour.

The bar mill 12 has an outer cylindrical wall 16 which is desirably jacketed as shown at 17 to permit some of the heat generated by agitation to be removed to thereby control the temperature of the ground paste which passes out of the mill through a screen 18 at the top and out of the mill via exit line 19. The temperature of the paste at exit is desirably maintained at 140°–150° F. for best results, the temperature being measured by a probe at 20 and used to control a valve 21 on the cooling water inlet line 22. The cooling water outlet is noted at 23'. While countercurrent flow of cooling water as shown is preferred, it is not essential.

The hot ground paste exits via line 19 into a small container 23 (ten gallon capacity). It is convenient to recycle the first ten to fifteen gallons of product back to the feed tank 10 by means not shown in order that the mill might reach an equilibrium as evidenced by a relatively constant exit temperature in order to produce paste of consistent Hegman reading.

Referring more particularly to the structure of the mill, a main shaft 24 extends axially through the mill and it is powered by a motor 25 at its upper end. As illustrated diagrammatically in FIG. 1, the main shaft 24 supports outwardly extending bars 26 the outer ends of which are widely spaced from the cylindrical walls 16 of the mill, the bars 26 being positioned in vertically spaced sections separated by the discs 27 which have a greater diameter and therefore extend closer to the walls 16 than do the bars 26 as will be discussed more fully hereinafter.

From the tank 23, the ground paste which may be contaminated with fragments of grinding media is pumped via lines 28 and 29 and filter pump 30 to an optional filter 31 which may conveniently be constituted by a 10-micron double cartridge Cuno filter. Adjusting the flow rate of the paste through the filter to be the same as that of the paste through the mill enables the contamination caused by the fragments of grinding media to be removed with usual operation being carried out at a pressure drop not in excess of 5 p.s.i. The filtered product is then passed via line 32 to a receiving tank 33 where the product is desirably maintained under agitation by an agitator 34.

While the attritor mill of the invention does not have to be used with any particular paste, it is convenient in the production of ordinary paints to prepare a paste containing a high proportion of pigment and then thin the ground paste with additional paint vehicle. Thus, and from the standpoint of the weight proportions of the paste, 60–85 parts of pigment (preferably 70–80) are mixed with 1–15 parts of vehicle binder (preferably 2–6) and 10 to 40 parts of vehicle solvent (preferably 15–30). Using typical epoxy ester resins and barytes pigment and weight proportions of the type noted, the 50–60 gallons per hour of ground paste produced represents from 185–220 gallons of finished paint. Best results are had with about 70–80 weight percent pigment, 2–5 weight percent vehicle binder and 15–25 weight percent vehicle solvent. A pre-grind paste viscosity of from 70–75 Kreb units is particularly appropriate.

The grinding media is constituted by relatively coarse beads which preferably are in the range of from 10–20 mesh. Ceramedia glass beads (type "LL", 10–14 mesh) represents a typical commercial quality glass bead to be used in the invention. Of course, some of the glass beads break and must be removed by filtration. Zirconium oxide beads are harder and resist breakage (Zircoa 1304, 10–20 mesh illustrate commercial practice). From the standpoint of the 40 gallon mill illustrated herein, 400 pounds of the Ceramedia glass beads or 750 pounds of the Zircoa beads represent appropriate initial charges of grinding media, it being understood that increments of grinding media must be added to replace loss through breakage or erosion.

Figure 2:
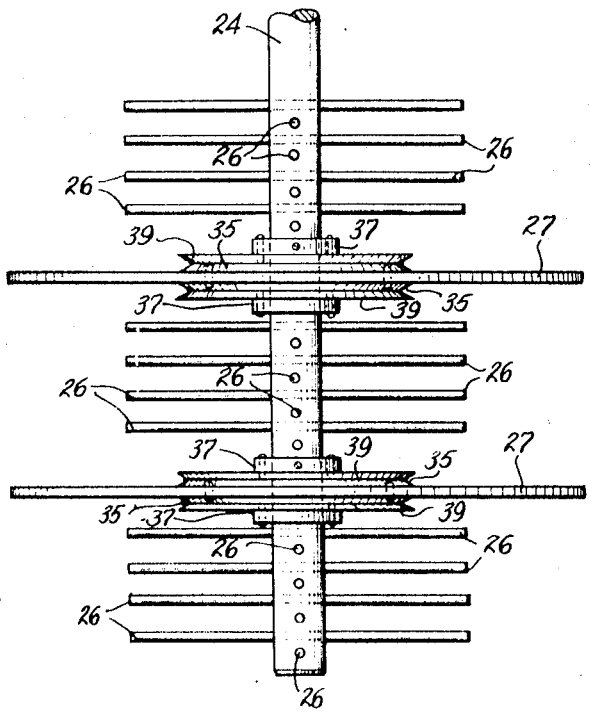
FIG. 2 is a partial side elevation showing the main shaft and the bars and discs supported thereby.

Referring to FIG. 2, it will be seen that the main shaft 24 supports the bars which extend through the shaft as shown and which preferably have a length of from 70% to 85%, preferably 75%–82%, of the internal diameter of the cylindrical chamber within which they move. This leaves adequate clearance to minimize erosion of the chamber wall while insuring that the bulk of the paste is sheared. On the other hand, the discs 27 must come closer to the chamber wall to insure complete mixing while still permitting adequate flow through the mill and this requires discs which have a diameter of from 85–96% of the internal diameter of the chamber, preferably from 90–95%.

The bars 26 are conveniently disposed at right angles to one another and, in the 40 gallon mill being discussed, are arranged in three groups of 8 bars each, each of these groups being spaced from the other by one of the discs 27.

Figure 3:
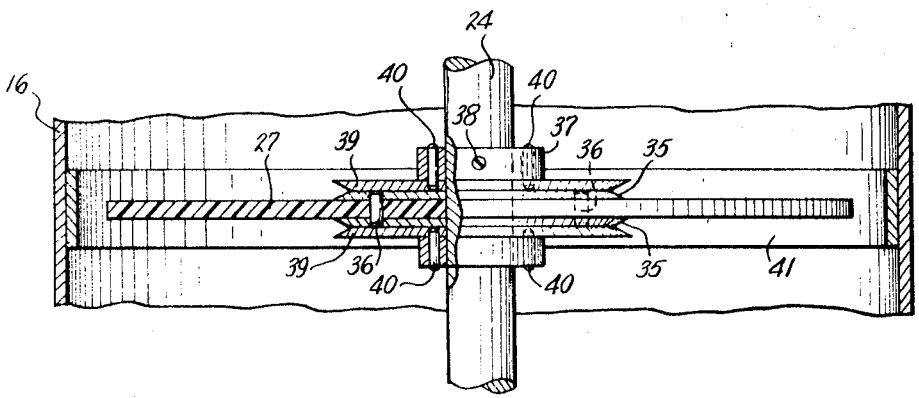
FIG. 3 is a detailed side elevation showing the mounting of the floating discs.

The discs 27 are preferably constituted by nylon discs ⅜" thick, these discs being rotatably mounted to "float" in the media in the manner shown in FIG. 2 and in greater detail in FIG. 3.

As can be seen, each nylon disc is reinforced on each of its opposite sides with a steel disc 35, these being illustrated discs ¼" thick and 9" in diameter, and having their peripheries tapered as shown. The reinforcing discs 35 are secured to one another through the disc 27 by means of pins 36. The discs 27 with their surrounding reinforcing discs 35 are positioned on the shaft 24 by means of collars 37 which are keyed to the shaft 24 by means of keys 38. In order to reduce friction the inner faces of the collars 37 carry bearing discs 39 which are pinned to the collars 37 by means of pins 40. The periphery of the bearing discs 39 is also tapered and it will be evident that as the rotating shaft 24 moves the rods 26 to grind the paste within the cylindrical chamber of the mill, the discs 27 can "float" in the grinding media.

Despite the floating action of the discs, the cylindrical wall 16 of the mill still experiences erosion in the immediate vicinity of the discs 27 and, as an optional feature of the invention, this erosion may be mitigated by means of wear-rings 41 which can be spot or tack welded to the cylindrical face of the wall 16. Thus, a typical wear-ring is illustrated by a steel ring ½" wide and ¼" thick. In a typical illustration and using a 40 gallon mill 16.5 inches in internal diameter, the discs 27 would measure 15 inches in diameter and, with the wear-ring 41, this would leave an annular clearance of ½ inch. The bars 26 would be ¾" in diameter and 13.5 inches long and adjacent bars would be vertically spaced 1" (center to center) and angled 90° with respect to one another. The bars extend through the shaft 24 as shown and are held in place by set screws (not shown).

As will be understood, considerable latitude in the speed of rotation can be tolerated, speeds of from 200–700 revolutions per minute being contemplated. Preferred operation of the specific mill discussed is at about 490 revolutions per minute.

The invention is not to be construed by any abstract of disclosure, but its features are instead characterized in the description given hereinbefore and is defined in the claims which follow.

We claim:

1. An attritor mill comprising a cylindrical wall defining a chamber and a shaft extending axially therethrough and carrying a plurality of radial bars vertically spaced along the length of said shaft, means to rotate said shaft to move said bars to shear a paste including a grinding media disposed within said chamber, said bars being spaced apart into vertically separated groups by means of discs which have a diameter of 85–96% of the internal diameter of the chamber and which extend closer to the walls of said chamber than do said bars, said discs being rotatably mounted with respect to the shaft to float in the paste being ground, means to feed said paste to one end of said chamber and exit means for the ground paste at the other end of said chamber.

2. An attritor mill as recited in claim 1 in which said bars extend through said shaft and have a length of from 70% to 85% of the internal diameter of said chamber.

3. An attritor mill as recited in claim 1 in which said cylindrical wall is jacketed to permit control of temperature.

4. An attritor mill as recited in claim 1 in which screen means is disposed at the exit end of said chamber to retain said grinding media within said chamber.

5. An attritor mill as recited in claim 1 in which said discs are made of nylon and are reinforced by smaller discs on opposite sides thereof.

6. An attritor mill as recited in claim 1 in which wear-rings are mounted on the interior of said cylindrical wall opposite said discs.

7. An attritor mill comprising a jacketed cylindrical wall defining a chamber and a shaft extending axially therethrough and carrying a plurality of radial bars vertically spaced along the length of said shaft, said bars extending through said shaft and having a length of from 70% to 85% of the internal diameter of said chamber, means to rotate said shaft to move said bars to shear a paste including a grinding media disposed within said chamber, said bars being spaced apart into vertically separated groups by means of discs which have a diameter of 85–96% of the internal diameter of the chamber and which extend closer to the walls of said chamber than do said bars, said discs being rotatably mounted with respect to the shaft to float in the paste being ground, means to feed said paste to one end of said chamber, exit means for the ground paste at the other end of said chamber, and screen means at the exit end of said chamber to retain said grinding media within said chamber.

8. An attritor mill as recited in claim 7 in which adjacent bars are positioned at right angles with respect to one another.

9. An attritor mill as recited in claim 7 in which said discs have a diameter of from 90–95% of the internal diameter of the chamber.

10. An attritor mill as recited in claim 9 in which said bars have a length of from 75–82% of the internal diameter of the chamber.

References Cited

UNITED STATES PATENTS

| | | | |
|---|---|---|---|
| 677,702 | 7/1901 | Russell | 241—188 X |
| 2,581,414 | 1/1952 | Hochberg | 241—46.17 X |
| 2,752,097 | 6/1956 | Lecher | 241—17 |
| 2,764,359 | 9/1956 | Szegvari | 241—46.17 X |
| 2,855,156 | 10/1958 | Hochberg | 241—46.17 X |
| 2,950,065 | 8/1960 | Smith | 241—46.11 |

ROBERT C. RIORDON, Primary Examiner

D. G. KELLY, Assistant Examiner

U.S. Cl. X.R.

241—46.17